June 17, 1930.  A. E. OZOUF  1,764,850
MEAT CUTTING AND HANDLING APPARATUS
Filed Dec. 3, 1926    3 Sheets-Sheet 1
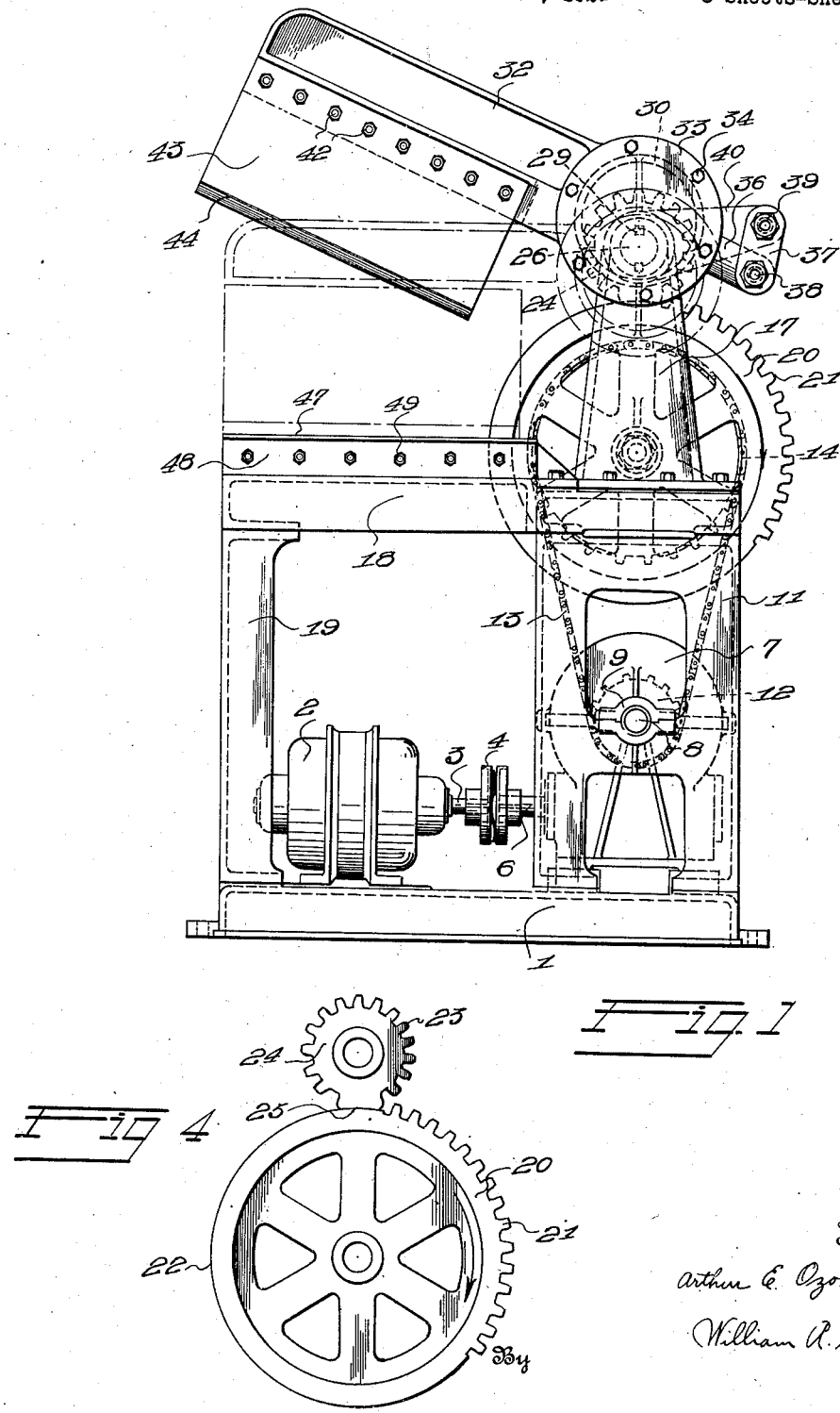

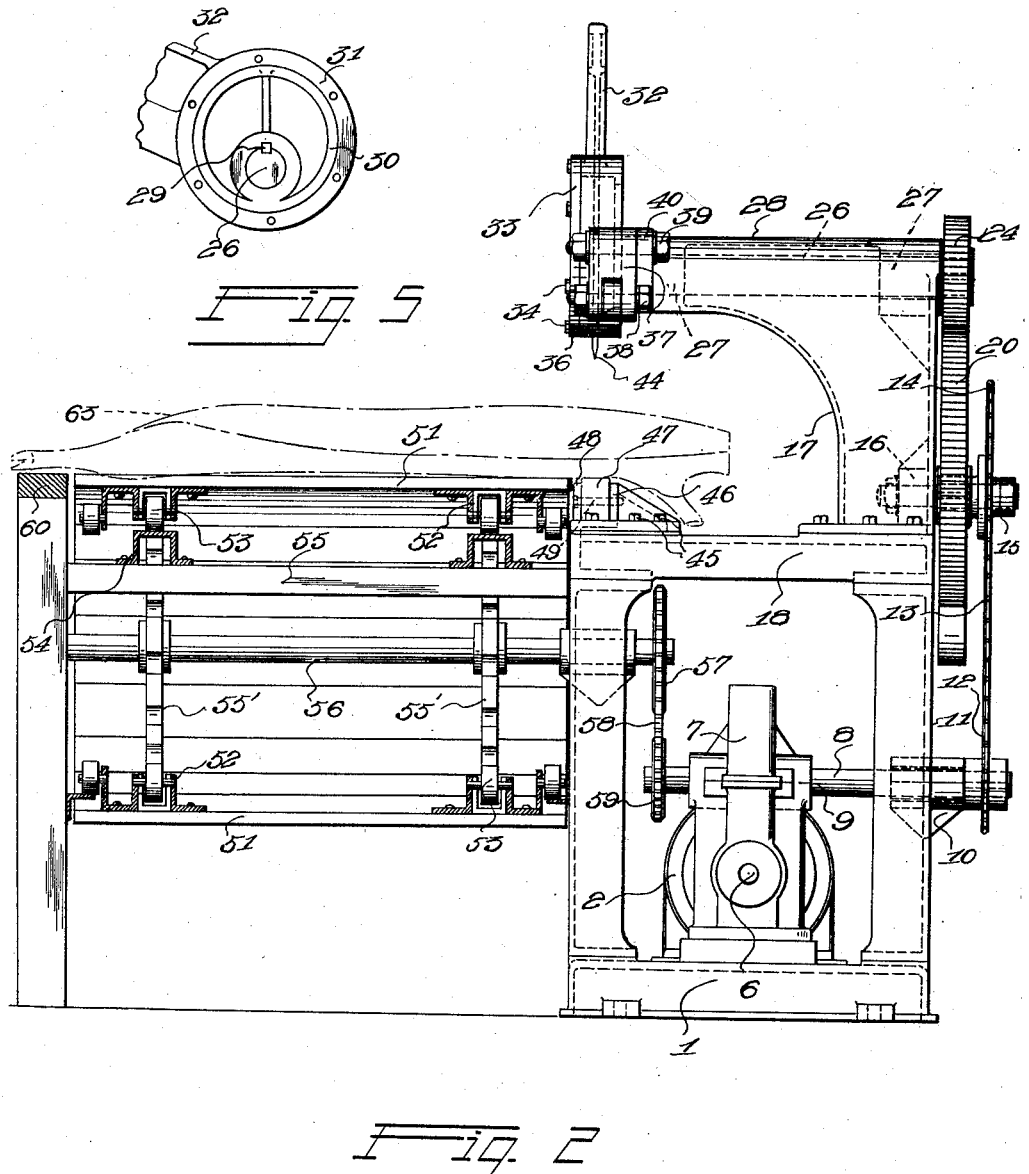

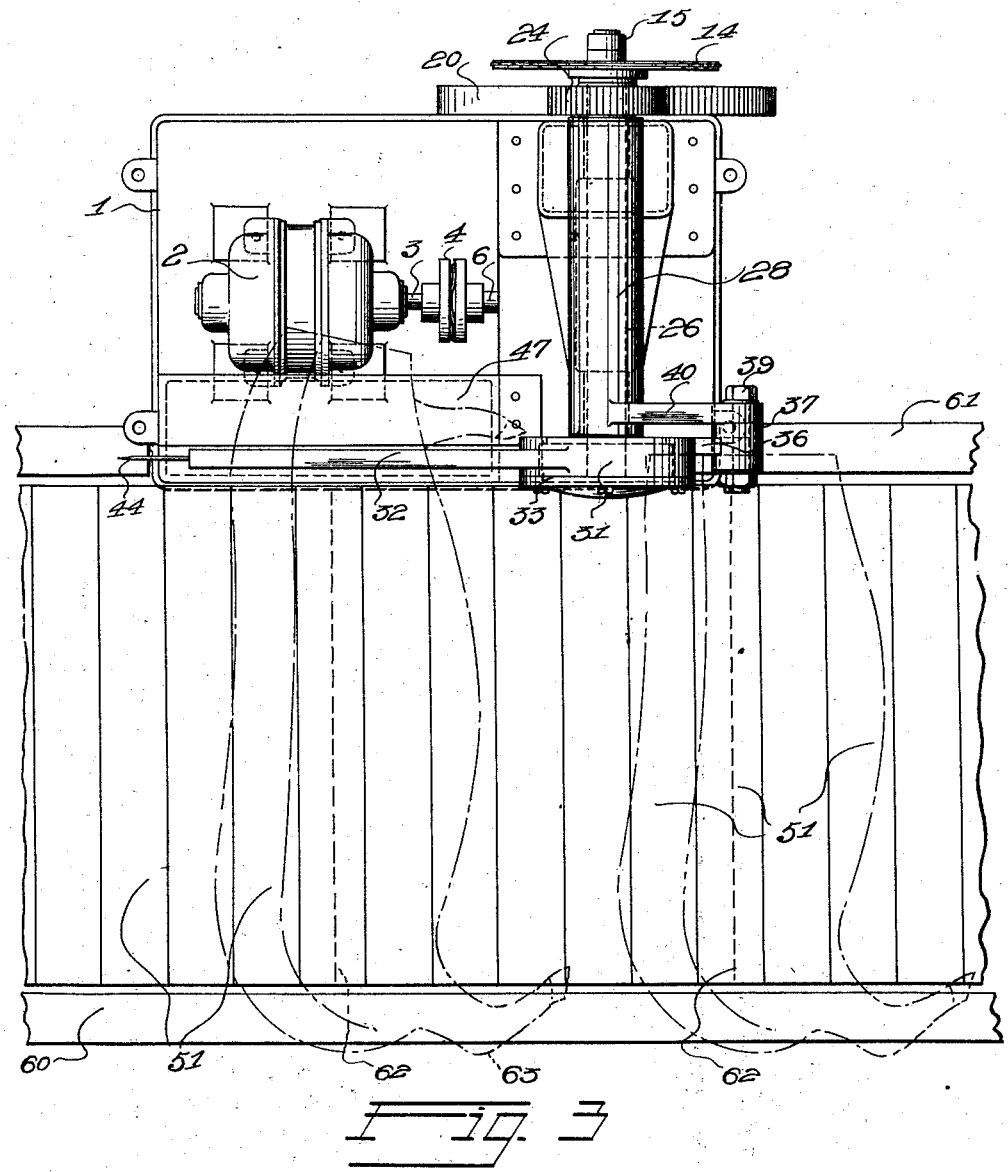

Patented June 17, 1930

1,764,850

UNITED STATES PATENT OFFICE

ARTHUR E. OZOUF, OF CHICAGO, ILLINOIS, ASSIGNOR TO THE ALLBRIGHT-NELL COMPANY, OF CHICAGO, ILLINOIS

MEAT CUTTING AND HANDLING APPARATUS

Application filed December 3, 1926. Serial No. 152,394.

The present invention relates to meat cutting apparatus for, and methods of handling meat products. More particularly the invention relates to chopping or cutting apparatus for severing shoulders or other parts from animal sides and to methods of trimming animal meat products in rapid and efficient manner.

It has heretofore been the practice in the packing industry to sever shoulders or other parts from the carcass sides by positioning the parts to be severed beneath vertically movable knives or chopping blades. The prior knives have generally been so constructed and arranged that the operator must reach beneath the knife to draw the product in a path under the blade in position for severing. Serious danger to the operator results necessitating care to avoid accidents which necessarily slows up the operation and increases the cost thereof. At the same time the carcass is subjected to considerable handling in positioning it under the knife for the severing operation and thereafter removing the cut parts from the knife to permit the succeeding operation. A further disadvantage of prior apparatus is that the cutting movements have been such that clean cuts are not effected, portions of the carcass are crushed, and frequently the skin or connecting tissues on the lower side are not cut through by the first operation which must be repeated before the parts are completely severed.

An object of the present invention is to provide a novel chopping apparatus for use in packing houses and especially adapted to sever shoulders or other parts from the sides of animal carcasses provided with an unobstructed path for the carcass to be severed through the cutting position so that substantial sections of animal carcasses may be severed without the necessity for shifting the sides endwise to get it into severing position.

Another object of the invention is to provide a chopping apparatus by which the carcass side to be severed may be moved into position longitudinally with the knife blade, severed, and moved continuously in an unobstructed path away from the knife.

Still another object of the invention is to provide a power operated cutting apparatus in which a novel chopping and cutting stroke is imparted to a chopping blade so that a clean cut entirely through a piece of meat to be severed may be made in a single operation and without crushing.

A further object of the invention is to provide continuous apparatus and methods for severing meat in which the products to be severed are moved continuously through a chopping device and severed without the necessity for manual handling during the trimming operation.

Further objects of the invention are such as may be made by a utilization of the various combinations, sub-combinations, steps and principles hereinafter set forth in the various relations to which they may obviously be adapted by one skilled in the art, and are such as are defined by the terms of the appended claims.

As shown in the drawings,

Figure 1 is a front elevation of a preferred form of chopping device, embodying certain of the principles of my invention.

Figure 2 is a side elevation of the form of invention shown in Figure 1 in its preferred relation to a moving top table for carrying out my improved method of handling meat products.

Figure 3 is a plan view of essential parts of the arrangement shown in Figure 2.

Figure 4 is a detail view showing the mutilated driving gears utilized.

Figure 5 is a detail view showing the knife driving eccentric.

A base casting 1 is provided on suitable pads on which the electrical drive motor 2 is supported. Motor 2 is provided with an armature shaft 3, which, through the friction or slip clutch 4 drives the shaft 6. Shaft 6 is supported in suitable bearings in gear casing 7 and through a worm gear and worm wheel (not shown) mounted in casing 7 drives the shaft 8. Shaft 8 is supported at one end in pedestal bearings 9, and at its other end is supported in a bearing 10, secured to frame casting 11 which in turn is supported from the base 1. Secured to the outer end of and driven by shaft 8 is the sprocket 12 which through a chain 13 drives sprocket wheel 14. Sprocket wheel 14 is rotatably journaled on the spindle 15 which in turn is secured to and extends from supporting section 16 of knife bar stand 17. Stand 17 is secured to top casting 18 which in turn is secured to the upper ends of the upright frame castings 11 and 19 secured to and supported from the base 1. Secured to and rotatable with sprocket 14 and journaled on spindle 15 is a mutilated driving gear 20 having teeth 21 formed on approximately one third of its periphery, and having smooth cylindrical locking surface 22 formed on the remainder of its periphery. Teeth 21 are adapted to mesh with teeth 23 of the pinion 24, which in turn is provided with smooth concave locking surface 25 adapted to engage the cylindrical surface 22 of the driving gear 20. Mutilated gear 20 and the mutilated pinion 24 are so shaped that for approximately one-third of a revolution of the gear, teeth 21 will mesh with teeth 23 of the pinion 24 turning the pinion through a complete revolution. At the end of the revolution, surface 25 of the pinion 24 will engage surface 22 of gear 21 and the pinion will be held against rotation until the teeth re-engage. Pinion 24 is keyed to and drives shaft 26 which is supported in suitable bearing sections 27 of overhanging section 28 of knife bar stand 17.

Secured to the outer end of shaft 26 by means of key 29 is an eccentric 30 on which is rotatably supported a suitable circular bore formed in the circular section 31 of knife bar 32. Cap 33 secured to section 31 by means of cap screws 34 holds the section 31 of the knife bar 32 in position on eccentric 30. Formed integrally with the section 31 of knife bar 32 is an extension 36 which fits in the bifurcated lower end of and is pivotally secured to link 37 by means of the securing pin 38. Link 37 at its upper end is secured by a pivot pin 39 to an extension 40 formed integrally with overhanging section 28 of knife bar stand 17. Secured to and depending from the knife bar 32 by means of studs or cap screws 42 is the knife 43 provided with a lower cutting edge 44. Secured to top casting 18 by means of studs 45 is a chopping block supporting casting 46 to which the wooden chopping block 47 is secured by means of the securing plates 48 and the studs 49.

The mechanism so far described may be positioned adjacent a stationary work table or bench with the upper level approximately flush with the level of chopping block 47. Motor 2 operates continuously driving mutilated gear 20. While the smooth section 22 of the gear 20 is in engagement with smooth section 25 of pinion 24, the pinion remains stationary, the knife is held in its uppermost position, and the meat is properly positioned beneath the knife, preferably by moving it from left to right in Figure 1 on to the chopping block. As rotation of gear 20 continues, teeth 21 will mesh with teeth 23 of pinion 24 rotating the pinion through a complete revolution. During the first half revolution of pinion 24, the action of cam 30 will swing knife bar 32 together with the knife 43 downward with a chopping motion bringing the edge 44 of the knife 43 substantially into contact and parallel with the top of chopping block 44, cleaving through the meat. During the second quarter revolution of pinion 24 and cam 30, the knife will, in addition to its downward movement, have a motion from left to right as viewed in Figure 1 imparted thereto. This gives the knife, in addition to the chopping movement, a sliding or cutting movement towards the end of the cutting stroke, and the knife will be drawn across the block completely severing the meat product. During the final half revolution of the pinion, the knife is swung upward by cam 30 to the position shown. Concave section 25 of the pinion will engage the smooth section 22 of the gear 20 during the remaining two thirds of the revolution of the gear. Knife 43 will accordingly be held in its uppermost position for two-thirds of each revolution of the gear 20, and during this interval the meat may be positioned on the block for cutting. During approximately the next one-sixth of the revolution of the gear 20, a quick chopping and sliding motion will be imparted to the knife, and during the remaining one-sixth revolution of the gear the knife 43 will be moved from its lowermost to its uppermost position.

It will be noted that the overhanging support for the knife blade provides an unobstructed path beneath and parallel to the length of the blade for meat to be cut so that meat may be pushed clear of the knife without meeting any obstruction. It will accordingly be seen that an operator need not reach beneath the knife blade to draw the meat to be cut into position and the cutting operation may be much more expeditiously performed than is possible in the arrangements heretofore proposed.

While the chopping and cutting apparatus described may be used in connection with a stationary work table, a movable top work table is preferably provided which is operated in synchronism with the chopper and so marked that an operator can position the meat to be cut on the markings; and it will then be automatically conveyed beneath the periodically operating knife in proper position and in properly timed relation to receive a chopping and severing blow from the knife. The severed section of the meat or carcass, such for example as the head or shoulder section, may be permitted to drop out of the way and the main section of the carcass may be conveyed along the top of the table to have further manufacturing operations performed thereon in well known manner. A preferred arrangement of apparatus for carrying out my continuous method of handling meat is shown in Figures 2 and 3 in which an endless moving top table made up of slats 51 is provided. Slats 51 are secured to the links of the endless conveyor chains 52. Secured in the chain links 52 are supporting rollers 53 which run on tracks 54 supported from the cross members 55 of a supporting framework. The chains pass around sprockets 55 (Figure 2) mounted on shaft 56 and are driven in definitely timed relation with the operation of the chopping blade 43, through driving sprocket 57 secured to shaft 56, chain 58 and sprocket 59, preferably mounted on shaft 8. The details of the moving top table and the drive mechanism therefor are not shown, but are well known in the packing industry. Stationary protecting rails 60 and 61 are preferably provided adjacent the moving slats 51 and the upper surfaces of the slats are arranged flush with the top of a chopping block 47. Lines 62 are applied to spaced slats 51 indicating the approximate position for the center of the meat, such for example as eviscerated halved hog carcasses 63 to bring them under the knife 43 in properly timed relation to the operation of the knife.

In operation of this arrangement, the carcasses 63 are positioned on the table with the section, such for example as the head and shoulder to be severed, extended over the edge of the moving top table so that the line of the cut to be made is in alignment with the blade 43 and with the centers of the carcasses approximately on a line 62 as shown. The table and chopper are driven synchronously and the carcasses are conveyed continuously from left to right in Figure 3 beneath the intermittently operated knife. As the carcasses pass beneath the knife the section protruding beyond the plane of the knife is severed with a single blow and the trimmed carcasses are conveyed continuously away from the knife without further handling. After the carcasses are trimmed further cutting operations may be performed on the moving top table if desired in well known manner in the production of meat products.

It will accordingly be seen that novel methods and apparatus have been provided for trimming parts of meat carcasses with a minimum of handling, a maximum efficiency, and maximum safety to the operator. It will be obvious to those skilled in the art that wide variations may be made from the details herein disclosed without departing from the spirit of my invention. Accordingly, what is desired to be secured by Letters Patent and claimed as new is:

1. A meat cutting machine comprising a cutting block, a standard positioned and spaced laterally of said block and having an overhanging arm permitting free access to said block, a cutter journaled in said arm for movement in planes transverse to said arm and extending longitudinally of said block and means to intermittently actuate said cutter to cause it to engage the meat with a combined chopping and draw cutting stroke.

2. A meat cutting machine comprising a cutting block, a cutter support projecting over said block but spaced therefrom vertically and laterally from the longitudinal edge thereof, a cutter mounted on said support to move in planes extending in the same longitudinal direction as said block, means to intermittently actuate said cutter and means to facilitate feeding the meat beneath the cutter in a direction longitudinal of said cutter.

3. A meat cutting machine comprising a support, a cutter block, a cutter operating shaft journaled in said support, a cutter extending with its cutting edge normal to said shaft axis, and means connecting said cutter to said shaft, and means causing said cutter to the moved toward and from said block and shifted longitudinally of said block during the cutting of the meat, and mechanism to intermittently actuate said cutter.

4. A meat cutting machine comprising a support, a block extending longitudinally of the support, a standard arranged laterally of said block and having an overhanging arm whereby free access may be had to one end of said block, a cutter supported on said arm with its cutter edge extending lengthwise of said block, and means to operate said cutter comprising elements that cause the cutter to approach and recede from the block and to move endwise of the block and in planes transverse to said arm during the cutting operation.

5. A meat cutting machine comprising a support, a cutter shaft, means to operate said shaft intermittently, a cutter supported for swinging and endwise movement in planes transverse to said shaft, and means secured to said shaft and to said cutter to cause it to partake of said movements.

6. A meat cutting machine comprising a support, a cutter shaft, means to operate said shaft intermittently, a cutter linked to said support, and a cam secured to said shaft and journaled to said cutter to cause it to swing and to move endwise.

7. A meat cutting machine comprising a support, a cutter shaft, a drive shaft, means to operatively connect said drive and cutter shaft including intermittent gears having locking surfaces to intermittently hold the cutter shaft from rotation, a cutter mounted for pivotal and endwise movement and a cam secured to said cutter shaft and journaled to said cutter to cause it to partake of said movements.

8. In combination, a feed table, a longitudinally arranged cutting block at one edge of said table, a cutter arranged over said block to swing on an axis that is transverse to said block and to move endwise thereof, and means to support and intermittently operate said cutter, said last named means permitting free movement of the meat on said feed table and over said block in the direction of the line of the cut.

9. The combination defined in claim 8 including a moving feed table having marks thereon to predetermine the position of the meat to be cut, said marks being arranged to cause the meat to be presented to the cutter in synchronism with the operation thereof.

10. A meat cutting machine comprising a support, a standard extending upwardly from said support, an arm extending laterally from said standard, a shaft supported in said arm for rotation about an axis extending lengthwise thereof, a cutter mounted for operation in planes substantially normal to said axis, means operated with said shaft for causing said cutter to move angularly and bodily endwise, means to feed meat beneath said arm and cutter, and means for intermittently operating said shaft.

11. A meat cutting machine comprising a cutting block, a cutter support, a shaft journaled in said support and provided with a cam, a cutter journaled on said cam and provided with an arm, a second arm secured to said support, a link connecting said arms together and means to operate said shaft.

12. A meat cutter comprising a relatively long meat guiding table, means on said table to facilitate the equal spacing of portions of meat arranged transversely of said table, a support adjacent said table provided with a standard substantially spaced from the edge of said table, said standard being provided with an overhanging arm spaced above the table, a cutter mounted on said arm for movement about an axis extending longitudinally of said arm and means for intermittently operating said cutter.

In testimony whereof I affix my signature.

ARTHUR E. OZOUF.